United States Patent [19]
Predöhl

[11] Patent Number: 5,178,806
[45] Date of Patent: Jan. 12, 1993

[54] PROCESS FOR PRODUCING A PLASTIC FOIL OF THERMOPLASTIC MATERIAL

[75] Inventor: Wilhelm Predöhl, Hennef-Bröhl, Fed. Rep. of Germany

[73] Assignee: Reifenhauser GmbH & Co. Maschinenfabrik, Troisdorf, Fed. Rep. of Germany

[21] Appl. No.: 752,695

[22] PCT Filed: Jan. 9, 1991

[86] PCT No.: PCT/DE91/00007

§ 371 Date: Sep. 4, 1991

§ 102(e) Date: Sep. 4, 1991

[87] PCT Pub. No.: WO91/10553

PCT Pub. Date: Jul. 25, 1991

[30] Foreign Application Priority Data

Jan. 10, 1990 [DE] Fed. Rep. of Germany ....... 4000530

[51] Int. Cl.⁵ .................... B29C 47/92; B29C 55/28
[52] U.S. Cl. ........................ 264/40.1; 264/211.12; 264/564; 425/141
[58] Field of Search ............... 264/40.1, 211.12, 564; 425/135, 141

[56] References Cited

U.S. PATENT DOCUMENTS 4,758,390 7/1988 Henze ................. 264/40.1

FOREIGN PATENT DOCUMENTS

| 260608 | 3/1988 | European Pat. Off. |
| 321936 | 6/1989 | European Pat. Off. |
| 2418452 | 10/1975 | Fed. Rep. of Germany |
| 2658518 | 6/1978 | Fed. Rep. of Germany |
| 3631503 | 9/1987 | Fed. Rep. of Germany |
| 3740088 | 11/1988 | Fed. Rep. of Germany |

*Primary Examiner*—Leo B. Tentoni
*Attorney, Agent, or Firm*—Herbert Dubno

[57] ABSTRACT

A process for the production of a plastic foil of thermoplastic material as well as for winding this plastic foil into a coil. The produced plastic foil has systematic thickness errors with plus thickness errors and minus thickness errors. The coil is practically free of thickness errors summed during winding. In order to achieve this, the thickness-error profile of the produced plastic foil with its systematic plus thickness errors and/or minus thickness errors is measured prior to the winding of the coil. A number n of layers of the plastic foil produced with the systematic plus thickness errors and/or minus thickness errors is wound up to a coil. After that, approximately a number n of layers of the plastic foil with the inverse thickness-error profile is wound on the coil. This is periodically repeated, n layers of plastic foil with the thickness-error profile alternating with approximately n layers with inverse thickness-error profile, until in the end the adequately cylindrical coil is produced.

2 Claims, 2 Drawing Sheets

PROCESS FOR PRODUCING A PLASTIC FOIL OF THERMOPLASTIC MATERIAL

CROSS REFERENCE TO RELATED APPLICATIONS

This application is a national phase of PCT/DE 91/00007 filed Jan. 9, 1991 and based upon German national application P 40 00 530.5 filed Jan. 10, 1990 under the International Convention. It is also related to my copending application Ser. No. 07/688,927 filed Apr. 19, 1991 and the commonly owned copending application Ser. No. 07/686,824 filed Apr. 17, 1991 by Hartmut Halter.

FIELD OF THE INVENTION

The invention relates to a process for the production of a plastic foil made of a thermoplastic material, as well as for the winding of this plastic foil into a coil, whereby the produced plastic foil has a thickness-error profile with systematic plus and minus thickness errors, the thickness-error profile of the produced plastic foil being measured prior to the winding of plastic foil into a coil so that the coil is practically free of thickness errors added up during the winding process.

BACKGROUND OF THE INVENTION

The expression "systematic thickness error" refers to the thickness errors which are determined by the system, for instance as a result of tool tolerances. They are unavoidable and occur without any intervention in the cross-sectional profile of the produced plastic foil, and in the installation for the production of the plastic foil always at the same locations. If no special steps are taken, these systematic thickness errors add up during the winding of the coil to positive or negative barrel-hoop formations in the roll of foil which is produced.

In the known processes which are the starting point of this invention, the attempt is made to avoid the summation of the thickness errors by displacement and statistical distribution of the thickness-error profile over the entire width of the plastic foil, so that during winding the summation of the thickness errors is replaced by an error distribution, so that the coil is practically free of the effects resulting from the local summation of thickness errors during coil winding.

Layer after layer, the thickness errors are in different locations in the coil. To achieve this in the production of so-called blown film, wherein at first a thermoplastic tube is produced, this tube is then blown to a tubular film and the tubular film is then flattened, either the blowing head with the tool for the tube extrusion must be given a periodic to and fro oscillating motion or the bubble or balloon flattening device must be correspondingly periodically moved. This requires an expensive construction and the results are often not fully satisfactory, because the resulting coil still has irregularities, even if it does not show pronounced barrel hoops.

In order to achieve the described error distribution when operating with a wide-slot nozzle it is known to reduce the magnitude of thickness errors, i.e. to level the thickness-error profile, according to a measured thickness-error profile, by adjusting the gap width of the wide-slot nozzle. The superposition and distribution of intended singular thickness errors is also known. As a result, these known steps the thickness tolerances can be reduced. However a disturbing thickness-error profile with a disturbing error addition are still be present in the coil.

OBJECT OF THE INVENTION

It is the object of this invention to so carry out the process that a coil results which is cylindrical to a much higher degree of precision than was heretofore possible with the known means.

In order to solve this problem the invention teaches that a number n of layers of the plastic foil produced with systematic plus thickness errors and/or minus thickness errors are wound to a coil, whereby $n = 1$ or is greater than 1 and that afterwards with a correspondingly programmed computer the inverse thickness-error profile is established and a plastic foil with the inverse thickness-error profiles is produced and a number of layers of the plastic foil with the inverse thickness-error profile is wound on the coil, and so on and so forth alternately layers of plastic foil with thickness-error profile and further layers of plastic foil with inverse thickness-error profile are wound up, until at the end the "adequate cylindrical" coil is produced with a satisfactory cylindrical configuration. In order to reset the thickness-error profile to the inverse thickness-error profile, for instance, the gap width of the tool from which the plastic foil or a preliminary product is formed can be modified correspondingly to the measured thickness-error profile or the inverse thickness-error profile by means of servo drives.

The thickness-error profile of a plastic foil can be easily measured with the aid of modern measuring technology, for instance by means of through-going radiation.

The measured thickness-error profile is fed to a computer which is programmed so that it establishes the inverse thickness-error profile. The number n of suitable layers can also be easily established. Among others, the number depends on the absolute thickness of the plastic foil. The computer can easily take into consideration that during the winding of the coil, the length of the individual layers increases. The inverse thickness-error profile does not have to have the same amplitude as the thickness-error profile. Differences in amplitude are acceptable and can be compensated by adjusting the number of layers with the thickness-error profile, or the inverse thickness-error profile which are wound upon each other. The best results are achieved when the thickness-error profile of the systematic errors is very carefully measured and the gap width of the tool is adjusted with corresponding precision. Various steps are known for this purpose (see for example, DE 34 27 912, DE 34 27 915, DE 35 30 383).

In order to achieve optimal results, it is also necessary that the last layer wound on the coil be a layer with the inverse thickness-error profile when the first number of layers were layers with the thickness-error of systematic errors and vice versa. According to a preferred embodiment of the invention in order to optimize the process, one proceeds so that the number n of layers of the plastic foil with the inverse thickness-error profile is wound upon a number of layers n presenting the thickness-error profile of systematic errors, whereby in this case one works with practically equal amplitudes of the profiles. During the winding of the coil, the number n can be increased depending on conditions.

Within the framework of the invention, it is no longer required to force an error redistribution of the foil as described previously. Particularly, one can operate with stationary tools from which a plastic foil can be directly or indirectly formed. In fact this means that a rotation of the blowing head during the production of the blown film is no longer necessary. In the embodiment for the production of blown film wherein at first a tubular foil is produced and this is then flattened in a flattening device, the invention teaches that the tubular foil is flattened in a stationary flattening device and is then directly fed to the coil, optionally after separation of sheets along folding edges. In the embodiment for the production of so-called flat film with the aid of widemouth nozzles, the invention teaches that the flat film is fed directly, i.e. without any special steps taken for redistribution.

According to the invention, the achieved advantages consist in that during the production of a plastic foil made of thermoplastic material, as well as during the winding of the plastic foil, a coil is created which is cylindrical with a higher degree of accuracy than it was possible to achieve by the known methods described in the introduction. According to the invention, during the winding of the coil the local thickness errors result in a zero-summation. The summands are the number of layers and the amplitude of the systematic and inverse thickness-error profiles. It is thereby within the framework of the invention not to count the number of layers, but to work with equivalent time measures, in order to achieve this zero-summation as accurately as possible.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
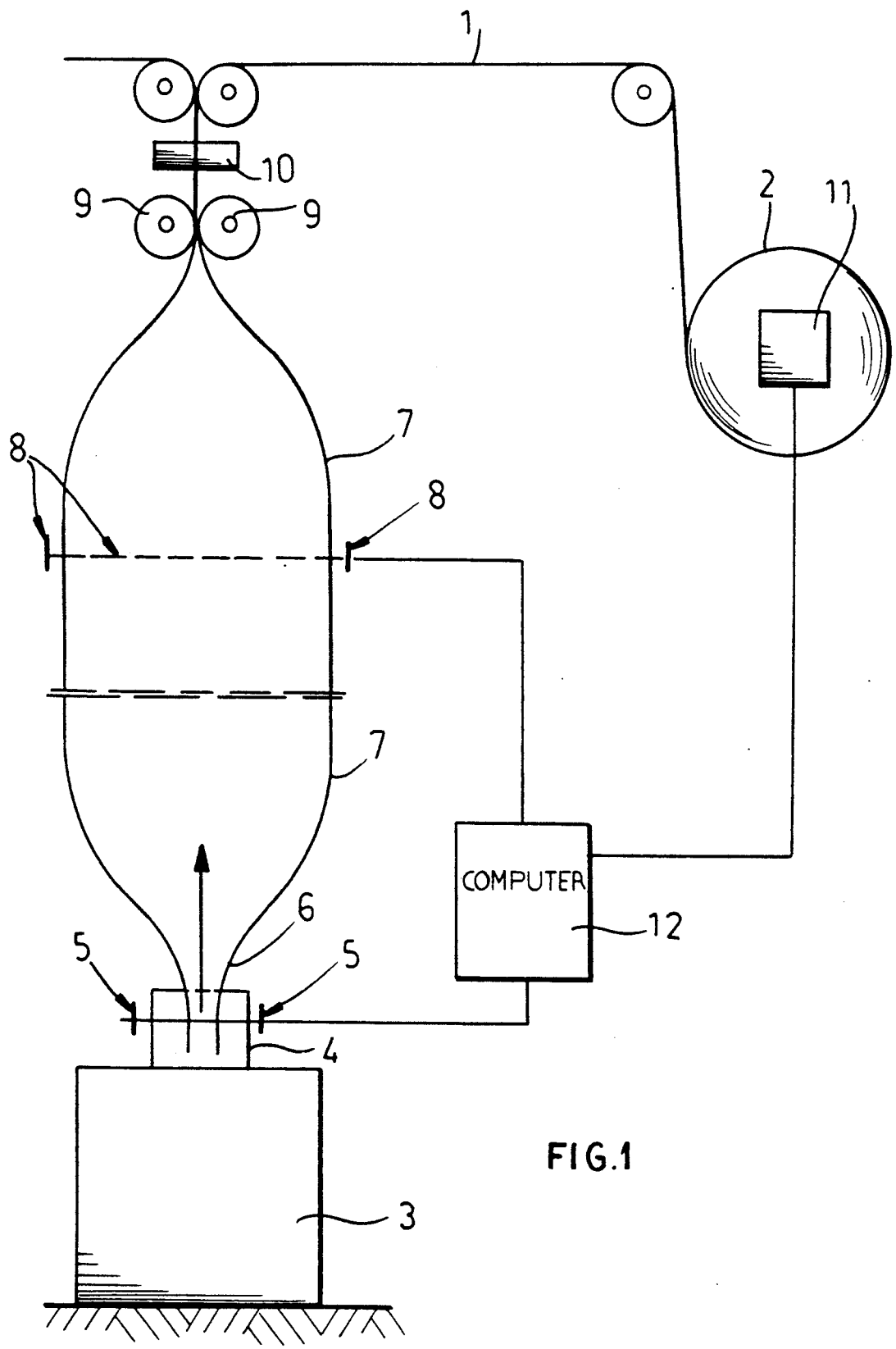
FIG. 1 is a schematic representation of an apparatus for carrying out the process of the invention.

The apparatus shown in FIG. 1 serves for the production of a blown film 1 which is wound into a coil 2. The apparatus comprises an extruder 3 with blow head 4. The annular nozzle gap is surrounded by a nozzle-gap adjustment device 5. A thermoplastic tubular foil 6 exits the annular nozzle gap. It is blown into a foil balloon 7. The foil balloon 7 is surrounded by thickness measuring device 8 for monitoring the foil thickness. The foil balloon is fed to the flattening device 9. A sectioning device 10 separates the flattened foil balloon into two simple, flat plastic foils 1, one of which is directed to the right, as shown, and is wound into coil 2, the other web being directed correspondingly to the left for winding. The winding arrangement shown in FIG. 1 has a measuring device 11, which allows the measuring of the number of circumvolutions, and thereby the number of layers of plastic foil 1 wound into coil 2. The measured values for the number of foil layer given by the thickness-measuring device 11 are fed to the computer 12. This computer controls the annular-gap adjustment device 5.

Figure 2:
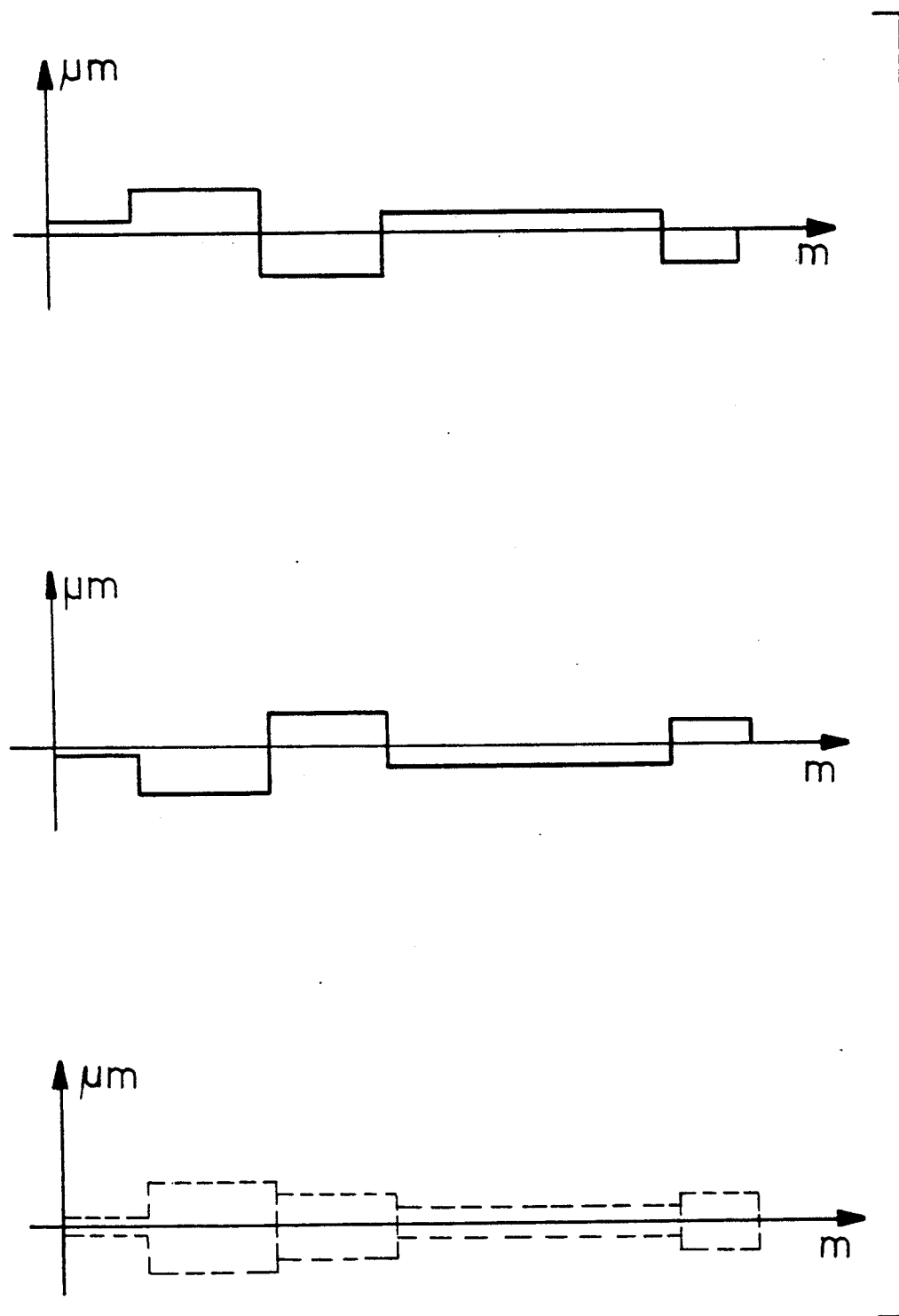
FIG. 2 is a diagram including three graphic representations which explain the process of the invention.

FIG. 2 shows three graphic representations arranged one under the other. On each of the abscissa axes the width of the plastic foils is marked in meters. On the axis of the ordinate, the thickness errors are marked in $\mu$m. In the upper graphic representation the thickness-error profile of the produced plastic foil 1 with its systematic plus thickness errors, which are indicated above the abscissa axis, and its minus thickness errors which are indicated below the abscissa axis. A number n of layers of the plastic foil 1 produced with systematic plus thickness errors and/or minus thickness errors is wound to a coil. The thickness-error profile is transmitted from the thickness-measuring device 8 to the computer 12. The computer 12 establishes the inverse thickness-error profile which can be seen in the middle graphic representation of FIG. 2. The lower graphic representation in FIG. 2 makes the superposition clear. It can be seen that as a result of the superposition of the thickness-error profile of the systematic errors and of the inverse thickness-error profile in the wound up layers, the thickness errors disappear. In the lower theoretical representation of FIG. 2, they disappear completely; in practice they are compensated to a high degree. As a consequence, at the end an adequately cylindrical coil 2 is produced.

I claim:

1. A process for producing a plastic foil of a thermoplastic material, consisting essentially of the steps of:
    (a) forming a plastic foil with systematic thickness errors including plus thickness errors and minus thickness errors with respect to a given thickness and having a certain thickness error profile across a width of the foil;
    (b) measuring said certain thickness error profile;
    (c) winding in a coil a number of turns of said foil with said certain thickness error profile;
    (d) computer generating an inverse thickness error profile from the certain thickness error profile measured in step (b) with minus thickness errors inverse to the plus thickness errors and plus thickness errors inverse to the minus thickness errors of said certain thickness error profile;
    (e) controlling the formation of the foil to impart said inverse thickness error profile thereto across said width of the foil;
    (f) winding in said coil a number of turns of said foil with said inverse thickness error profile; and
    (g) alternately winding in said coil numbers of turns of said web with said certain thickness error profile and said inverse thickness error profile to complete a roll of said foil with a substantially cylindrical configuration and without distributing said systematic thickness errors across said width and without additional regulation of foil thickness to said given thickness.

2. The method defined in claim 1 wherein last turns of the foil wound on said roll are of said inverse thickness error profile.

* * * * *